United States Patent [19]

Hynds

[11] Patent Number: 5,064,216
[45] Date of Patent: Nov. 12, 1991

[54] END LINK ASSEMBLY FOR AN AUTOMOTIVE VEHICLE SUSPENSION SYSTEM

[75] Inventor: Ernest J. Hynds, Saginaw, Mich.

[73] Assignee: General Motors Corporation, Detroit, Mich.

[21] Appl. No.: 562,976

[22] Filed: Aug. 6, 1990

[51] Int. Cl.⁵ .............................................. B60G 11/18
[52] U.S. Cl. .................................. 280/689; 280/716; 280/723; 74/579 R
[58] Field of Search ............. 267/258; 280/95.1, 96.1, 280/660, 663, 671, 673, 675, 690, 716, 104, 664, 665, 668, 691, 717, 721, 689, 723; 248/635, 638; 74/579 R

[56] References Cited

U.S. PATENT DOCUMENTS

| | | | |
|---|---|---|---|
| 2,825,576 | 3/1958 | Allison | 280/104 |
| 3,028,172 | 4/1962 | Herbenar | 280/95.1 |
| 3,692,295 | 9/1972 | Cass et al. | 267/57 |
| 4,042,258 | 8/1977 | Cislo | 280/664 |
| 4,161,812 | 7/1979 | Litch, III | 248/638 X |
| 4,203,615 | 5/1980 | Cislo et al. | 280/689 |
| 4,219,208 | 8/1980 | Fuller et al. | 280/95.1 |
| 4,336,953 | 6/1982 | Low | 280/95.1 |
| 4,460,197 | 7/1984 | Rogers | 280/95.1 |
| 4,779,834 | 10/1988 | Bittner | 248/638 |
| 4,798,397 | 1/1989 | Komiya | 280/660 |

Primary Examiner—Kenneth R. Rice
Assistant Examiner—Tamara L. Finlay
Attorney, Agent, or Firm—A. Michael Tucker

[57] ABSTRACT

An end link assembly includes an elongated link terminating in a barrel portion at one end and a ring portion at the other end. An elastomeric bushing having a pair of flexible annular walls projecting outwardly from an outer surface is mounted at the ring portion of the link. A stabilizer bar is press fitted into the bushing. The barrel portion is mounted to the control arm by a fastener. During operation, the bushing provides a working angle large enough to accommodate the movement between the stabilizer bar and the link.

8 Claims, 2 Drawing Sheets

END LINK ASSEMBLY FOR AN AUTOMOTIVE VEHICLE SUSPENSION SYSTEM

BACKGROUND OF THE INVENTION

1. Field of the invention

The present invention relates generally to automotive vehicle suspension systems and, more particularly, to an improved end link assembly connected between a control arm and a stabilizer bar.

2. Statement of the related art

The use of roll stabilizer bars in automotive wheel suspension systems is well-known. Generally, an end link is connected between a control arm and a stabilizer bar. When the control arm moves as a result of a road input, the end link transmits all or part of the movement to the stabilizer bar. The spring effect of the stabilizer bar is then transmitted through an opposite end link to a control arm on the other side of the vehicle to resist the rolling motion of the vehicle.

Conventional stabilizer bars terminate at each end in a paddle or eyeform with a hole to receive a bolt or threaded weld stud. The end link is placed on the bolt and secured with a nut. The end link often includes an elastomeric bushing and metal sleeve to permit the linkage to rotate relative to the stabilizer bar.

During operation, the control arm pivots about a line through its attachment points to the frame. As a result, the connection point where the end link is attached to the control arm moves through an arc. A prior art method of allowing this movement to occur is to allow the end assembly to rotate relative to the control arm. Concurrently, the stabilizer bar pivots about a line through its attachment points to the frame. Therefore, the end link must also accommodate movement of an end of the stabilizer bar as the bar rotates due to road inputs.

The art continues to seek improvements. It is desirable to eliminate the costly eyeforms on the ends of the stabilizer bar. It is also desirable to eliminate the bolt or stud and nut that fasten the end link to the stabilizer bar. A new design for the connection between the stabilizer bar and end link must accommodate the relative motions between the end link and the stabilizer bar and the end link and the control arm.

SUMMARY OF THE INVENTION

The present invention provides an improved end link assembly for connecting a rotatable stabilizer bar and a pivotable control arm. The improved end link eliminates the need to form an eyeform in an end of the stabilizer bar, thereby eliminating the need for a bolt and nut. Furthermore, the present end link assembly includes a link which can be molded from a suitable plastic material. An elastomeric bushing accommodates the movement between the stabilizer bar and the link. The present end link assembly is suitable for use with conventional stabilizer bars and control arms.

In a preferred embodiment, the present end link assembly includes an elongated link terminating in a barrel portion at one end and a ring portion at the other end. An elastomeric bushing having a pair of flexible annular walls projecting outwardly from an outer surface is mounted at the ring portion of the link. A stabilizer bar is press fitted into the bushing. The barrel portion is mounted to the control arm by a fastener. During operation, the bushing provides a working angle large enough to accommodate the movement between the stabilizer bar and the link.

DETAILED DESCRIPTION OF THE PREFERRED EMBODIMENT

Figure 1:
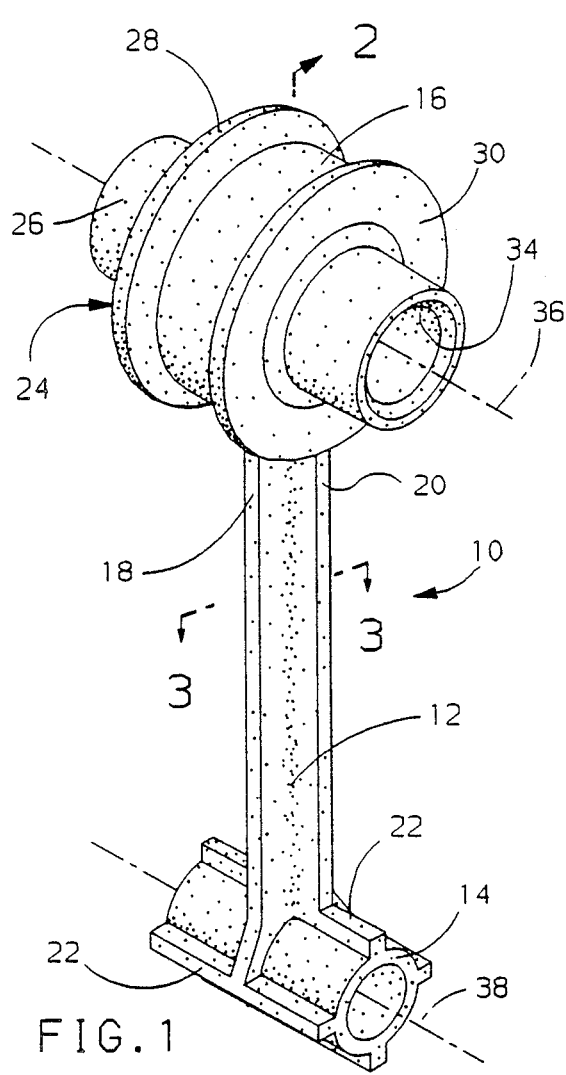
FIG. 1 is a perspective view of a preferred embodiment of an end link assembly according to the present invention.
Figure 2:
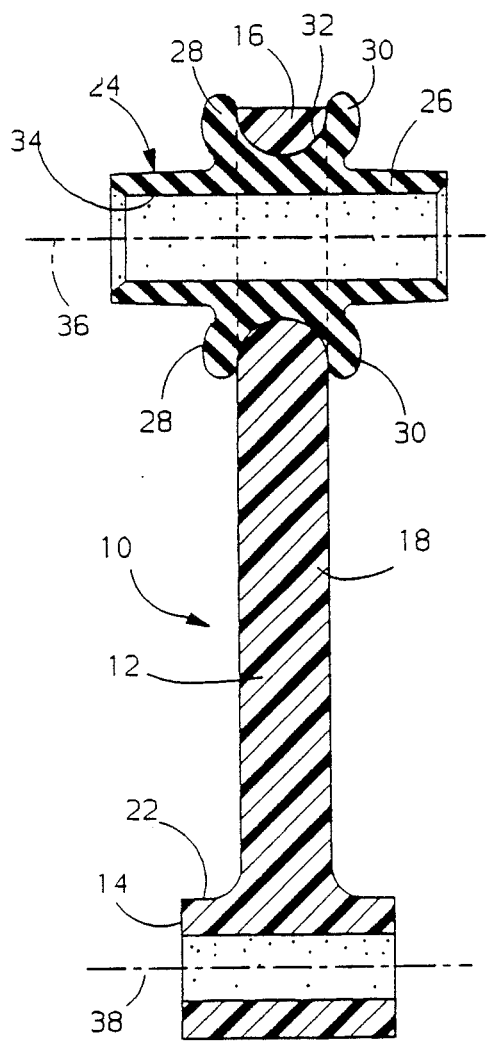
FIG. 2 is a sectional view taken along Line 2—2 of FIG. 1.

An end link assembly indicated generally at 10 is illustrated in FIGS. 1 and 2. The assembly 10 includes an elongated link 12 having a hollow barrel portion 14 provided at a first end and a ring portion 16 provided at a second end. Preferably, the link 12, the barrel portion 14 and the ring portion 16 are integrally molded from a suitable plastic material, e.g., DELRIN. In other embodiments, the link 12, the, barrel portion 14 and the ring portion 16 can be die cast in aluminum or other suitable material or be of a welded construction.

Figure 3:
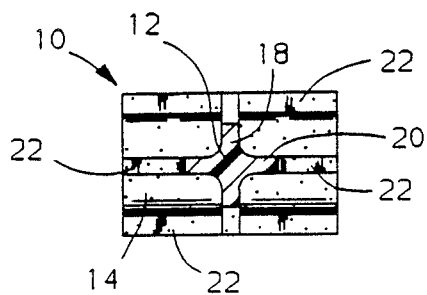
FIG. 3 is a sectional view taken along Line 3—3 of FIG. 1.

As illustrated best in FIG. 3, the cross section of the link 12 can include longitudinal ribs 18, 20 to increase strength and resistance to stresses. Preferably, the ribs 18, 20 are integrally molded on the outer surface of the link 12. Other cross sections for the link 12 are within the scope of the invention. Also, the barrel portion 14 may include axial ribs 22 integrally molded on its outer surface to increase its strength and resistance to cracking or failing.

An elastomeric bushing indicated generally at 24 is fitted for and retained by the ring portion 16. Preferably, the bushing 24 is molded from an elastomeric material, such as polyisoprene or natural rubber. The bushing 24 includes a tubular body 26 having a pair of flexible annular walls 28, 30 projecting outwardly from an outer surface. A groove 32 (FIG. 2) is provided between the annular walls 28, 30 to receive the ring portion 16. An axial passageway 34 is provided in the tubular body 26. For assembly, one end of the tubular body 26 is inserted through the ring portion 16 so that one of the walls 28, 30 resiliently compresses to permit the ring portion 16 to be fitted in the groove 32. When assembled, a longitudinal axis 36 of the tubular body 26 is aligned with a longitudinal axis 38 of the barrel portion 14. As described below, the bushing 24 provides a flexible mount which rotates with respect to the link 12 and provides a greater working angle over the prior art.

Figure 4:
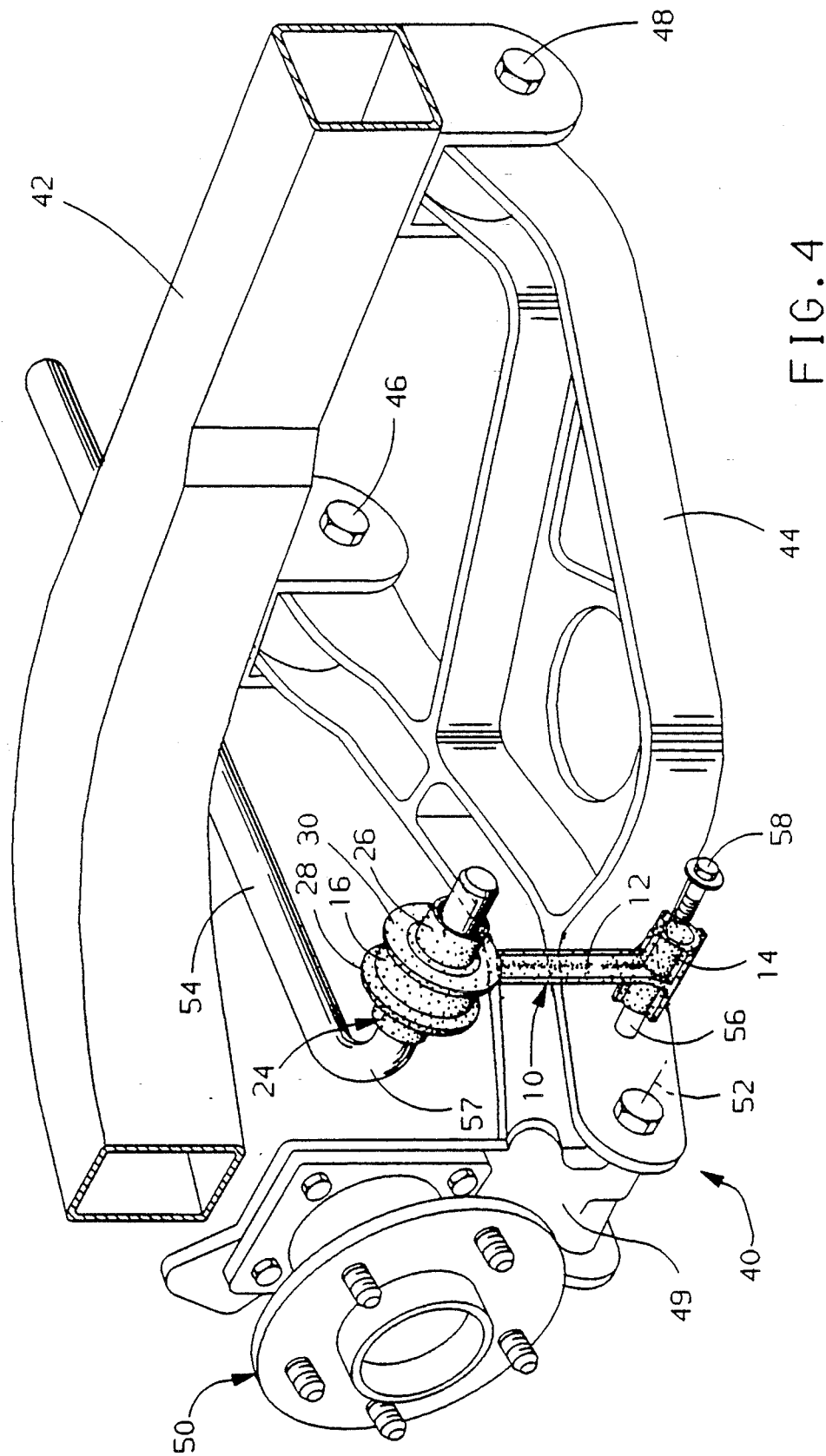
FIG. 4 is a perspective view of an automotive suspension system wherein the end link assembly of FIG. 1 is mounted between a control arm and a stabilizer bar.

An automotive suspension system is partially illustrated in FIG. 4 and designated generally at 40. The suspension system 40 includes a rigid frame member 42 aligned with the longitudinal axis of a vehicle. A control arm 44 is pivotally mounted to the frame at a first end by pivot axes 46 and 48. At the opposite end, the control arm 44 is pivotally connected to a knuckle 49 which supports a wheel mounting assembly 50 by pivot axis 52. As a wheel (not illustrated) mounted on the wheel mounting assembly 50 travels up and down, the control arm 44 pivots with respect to the frame 42 in a well-known manner.

The end link assembly 10 is mounted between and connects the control arm 44 with a stabilizer bar 54. The barrel portion 14 receives a mounting boss 56 projecting from the control arm 44, which in turn receives a fastener 58 threadedly mounted to the boss 56. If desired, an elastomeric bushing (not illustrated) lined with a metal sleeve can be mounted in the barrel portion 14 prior to insertion on the boss 56.

A bent end 57 of the stabilizer bar 54 is inserted into the passageway 34 of the tubular body 26. Preferably, the diameter of the passageway 34 is sized so that it stretches to accommodate the bent end 57 and provides a snug fit. As the control arm 44 pivots due to input from the wheel assembly 50, the movement is transmitted to the stabilizer bar 54 by the end link assembly 10. The spring effect in the stabilizer bar 54 is then transmitted to the opposite end where a second end link assembly 10 (not illustrated) is mounted on the opposite side of the vehicle.

Figure 5:
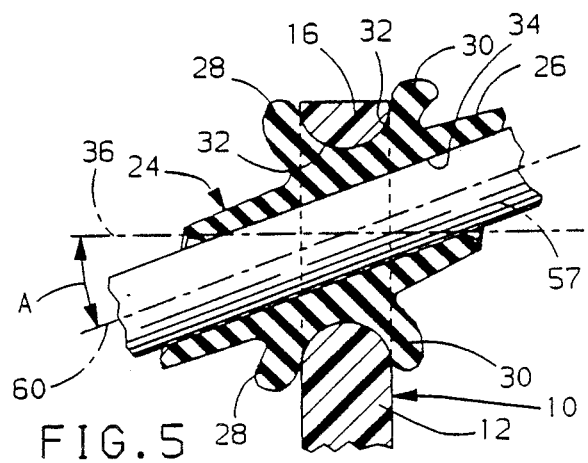
FIG. 5 is a sectional view of a portion of the end link assembly of FIG. 1 mounted on a stabilizer bar illustrating the deformation of a bushing resulting from the rotation of the stabilizer bar.

The bushing 24 accommodates the rotation of the stabilizer bar which results in the angular movement of the bent end 57 as illustrated in FIG. 5. As the stabilizer bar 54 rotates due to road inputs, the bent end 57 is displaced and results in a working angle A formed by the original axis 36 of the undeflected tubular body 26 and the axis 60 of the bent end 57. The annular walls 28, 30 are resiliently deformed to permit a pivoting motion of the bent end 57 with respect to ring portion 16. The working angle A is greater than the previous art as the ring portion 16 engages only a relatively small portion of the bushing 24.

The present end link assembly 10 provides an economical improved linkage which is adaptable for conventional suspension systems. Previously utilized eyeforms and bolts are not required to connect a stabilizer bar with a linkage.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A suspension system for a vehicle, comprising:
    (a) means for mounting a wheel assembly;
    (b) a control arm pivotally connected to the wheel assembly mounting means;
    (c) means for pivotally mounting the control arm to a vehicle frame;
    (d) a stabilizer bar having a central elongated portion and at least one bent end; and
    (e) a linkage assembly, for connecting the stabilizer bar to the control arm, having
        (i) an elongated link terminating at one end in means for removably connecting the link to the control arm at the other end in a ring portion;
        (ii) an elastomeric bushing including a tubular body having an axial passageway and a pair of flexible, annular walls defining a groove therebetween for receiving the ring portion of the link.

2. The suspension system specified in claim 1 wherein the diameter of the axial passageway is sized to stretch over the stabilizer bar and provide a snug fit.

3. The suspension system specified in claim 1 wherein the means for connecting the link to the control arm comprises a barrel portion.

4. The suspension system specified in claim 3 wherein the link, barrel portion and the ring portion are integrally molded.

5. The linkage assembly specified in claim 3 wherein ribs are provided on the barrel portion.

6. The linkage assembly specified in claim 3 wherein the link, barrel portion and the ring portion are molded from a plastic material.

7. The linkage assembly specified in claim 1 wherein the diameter of the axial passageway is sized to stretch over the stabilizer bar and provide a snug fit.

8. The linkage assembly specified in claim 1 wherein ribs are provided on the link.

* * * * *